(12) United States Patent
Nago et al.

(10) Patent No.: US 7,634,670 B2
(45) Date of Patent: Dec. 15, 2009

(54) COMMUNICATION APPARATUS AND METHOD OF CONTROLLING SAME

(75) Inventors: Hidetada Nago, Kawasaki (JP); Kenichi Fujii, Katsushika-ku (JP); Takatoshi Hirose, Yokohama (JP); Takahiro Shichino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 11/376,785

(22) Filed: Mar. 15, 2006

(65) Prior Publication Data

US 2006/0212610 A1    Sep. 21, 2006

(30) Foreign Application Priority Data

Mar. 15, 2005    (JP)    ............... 2005-073949

(51) Int. Cl.
*G06F 3/00*    (2006.01)
(52) U.S. Cl. ............... 713/300; 379/93.01; 379/100.12; 455/556.1; 358/442; 358/468
(58) Field of Classification Search ................. 713/300; 379/93.01, 100.12; 455/556.1; 358/442, 358/468
See application file for complete search history.

(56) References Cited

U.S. PATENT DOCUMENTS

| 5,699,511 | A | 12/1997 | Porcaro | |
|---|---|---|---|---|
| 6,038,225 | A | 3/2000 | Nago | |
| 6,157,465 | A | 12/2000 | Suda | |
| 6,205,502 | B1 * | 3/2001 | Endo et al. ................... | 710/100 |
| 6,477,570 | B1 | 11/2002 | Takayama | |
| 6,529,522 | B1 | 3/2003 | Ito et al. | |
| 6,603,744 | B2 | 8/2003 | Mizutani | |
| 6,756,898 | B2 | 6/2004 | Ikematsu | |
| 6,912,651 | B1 | 6/2005 | Hamdi | |
| 7,010,638 | B2 | 3/2006 | Deng | |
| 7,024,501 | B1 * | 4/2006 | Wright ......................... | 710/72 |
| 7,151,949 | B2 * | 12/2006 | Cavill et al. .............. | 455/556.1 |
| 7,207,059 | B1 * | 4/2007 | Kurian et al. .................. | 726/9 |
| 7,233,408 | B2 * | 6/2007 | Henderson et al. ......... | 358/1.15 |
| 7,353,391 | B2 | 4/2008 | Sato | |
| 7,373,434 | B2 * | 5/2008 | Yoshida et al. ................ | 710/14 |
| 7,453,880 | B2 | 11/2008 | Masao | |

(Continued)

FOREIGN PATENT DOCUMENTS

CN    1132381    12/2003

(Continued)

OTHER PUBLICATIONS

An article from Axis Communications, "Mobile Printing—Today and in the Future", Network Print Servers, Rev.:1.1, pp. 1-10, last updated (Feb. 5, 2001).

(Continued)

*Primary Examiner*—Abdelmoniem Elamin
(74) *Attorney, Agent, or Firm*—Cowan, Liebowitz & Latman, P.C.

(57) ABSTRACT

A wireless communication apparatus having a wired interface for wired connection to a terminal device and a wireless unit for connection to a terminal device wirelessly discriminates the state of power supply at start-up and, based upon the result of discrimination, relays data communication between the terminal device connected to the wired interface and another terminal device connected by the wireless unit.

6 Claims, 8 Drawing Sheets

U.S. PATENT DOCUMENTS

| | | | |
|---|---|---|---|
| 2001/0009018 A1 | 7/2001 | Iizuka | |
| 2003/0012132 A1 | 1/2003 | Novaes | |
| 2003/0086388 A1 | 5/2003 | Peters | |
| 2003/0224820 A1 | 12/2003 | Einola | |
| 2004/0088449 A1 | 5/2004 | Sakaki | |
| 2004/0122649 A1 | 6/2004 | Bartek | |
| 2004/0218204 A1 | 11/2004 | Nomura | |
| 2004/0218209 A1 | 11/2004 | Hamaguchi | |
| 2004/0223180 A1* | 11/2004 | Brooks | 358/1.15 |
| 2005/0048953 A1 | 3/2005 | Ohara | |
| 2005/0060419 A1 | 3/2005 | Fujii | |
| 2005/0066197 A1 | 3/2005 | Hirata | |
| 2005/0088689 A1 | 4/2005 | Suga et al. | |
| 2005/0091437 A1 | 4/2005 | Yang | |
| 2006/0020723 A1 | 1/2006 | Chia-Chun | |
| 2006/0200563 A1 | 9/2006 | Hirose | |
| 2006/0200564 A1 | 9/2006 | Watanabe | |
| 2006/0206592 A1 | 9/2006 | Fujii | |
| 2006/0246946 A1 | 11/2006 | Moritomo | |
| 2006/0246947 A1 | 11/2006 | Fujii | |
| 2006/0268744 A1 | 11/2006 | Sakai | |
| 2007/0002867 A1 | 1/2007 | Shitano | |

FOREIGN PATENT DOCUMENTS

| | | |
|---|---|---|
| EP | 0169244 | 7/1991 |
| JP | 09-153897 | 6/1997 |
| JP | 10-257119 | 9/1998 |
| JP | 11-239312 | 8/1999 |
| JP | 2002-118577 | 4/2002 |
| JP | 2003-087276 | 3/2003 |
| JP | 2003-110585 | 4/2003 |
| JP | 3094734 | 7/2003 |
| JP | 3094734 U | 7/2003 |
| JP | 2004-9388 | 1/2004 |
| JP | 2004-009388 | 1/2004 |
| JP | 2004-009388 A | 1/2004 |
| JP | 3530847 | 5/2004 |
| JP | 2004-171158 | 6/2004 |
| JP | 2005-011246 | 1/2005 |
| JP | 2005-011246 A | 1/2005 |
| JP | 2005-044094 | 2/2005 |
| KR | 1985-7000172 | 10/1985 |
| KR | 2005-0102824 | 10/2005 |
| KR | 2005-0119407 | 12/2005 |
| KR | 2006-0079516 | 7/2006 |
| WO | 00/42740 | 7/2000 |
| WO | 01/48613 | 7/2001 |
| WO | 03/052606 | 6/2003 |

OTHER PUBLICATIONS

An article from Axis Communications, "Axis 5810, A Bluetooth™ Print Plug" (XP002389023) [Online] 2002, pp. 1-2.

An article "FotoNation Printer Dongle" (XP002389024) [Online] 2006, pp. 1-2.

The US Publication reference and foreign Patent Document # 3 (2004-009388) were cited in a related U.S. Appl. No. 11/373,196.

* cited by examiner

COMMUNICATION APPARATUS AND METHOD OF CONTROLLING SAME

FIELD OF THE INVENTION

This invention relates to a communication apparatus having a wired interface to connect via wire to a terminal device, and a wireless unit for wireless connection to a terminal device.

BACKGROUND OF THE INVENTION

A method in which a digital camera and a printer are connected directly by wire to perform printing has already been proposed. Control information and print data are exchanged between the printer and the digital camera by an operating flow described in, e.g., Patent Document 1 [Japanese Patent Application Laid-Open No. 2004-9388 (Patent Registration No. 03530847)].

Further, a technique in which a signal is switched between networks of different physical layers is disclosed in, e.g., Patent Document 2 [U.S. Pat. No. 6,529,522 (Japanese Patent Application Laid-Open No. 10-257119)].

In the description that follows, the printer of the present invention refers to one that is connected to a digital camera physically or logically and is capable of receiving data directly from the digital camera.

Figure 1:
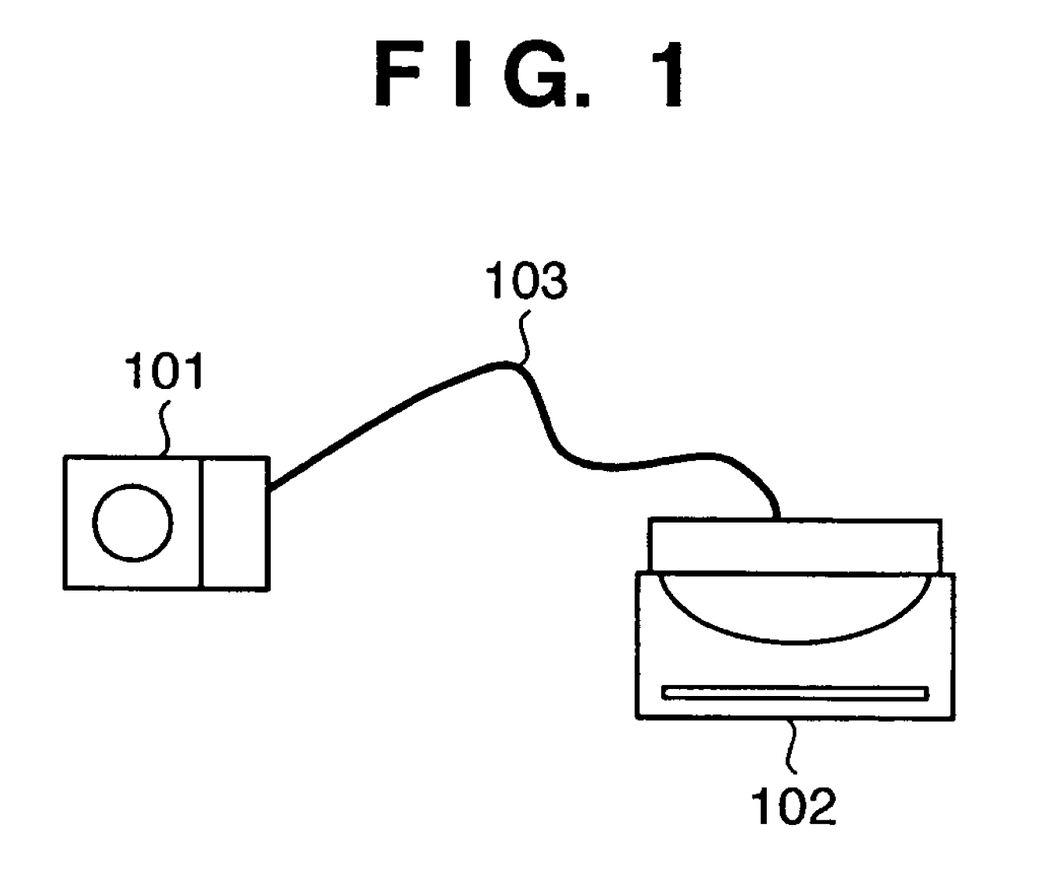
FIG. 1 is a diagram illustrating an example of a wired connection between a digital camera and a printer.

FIG. 1 is a diagram illustrating an example of a wired connection between a digital camera 101 and a printer 102. As shown in FIG. 1, the digital camera 101 and the printer 102 are connected directly by a cable 103 such as a USB cable. If image data is to be printed, it is required that the user plug and unplug the cable 102 before and after printing. A wireless system has been considered as a replacement for cables in order to reduce the plugging and unplugging burden on the user.

It is of course possible to simply adopt a wireless system for a wireless-capable digital camera and wireless-capable printer. However, there is also a need to allow a user who utilizes an existing wire-capable printer to enjoy wireless service by connecting a wireless communication device to the existing wire-capable printer.

However, operation of an existing wire-capable printer is such that when the printer is connected by cable, an operating sequence runs and connects the printer to the digital camera automatically, as set forth in Patent Document 1.

Consequently, although a wireless communication device and a printer are connected, there is no guarantee that a wireless connection between a wireless-capable digital camera and the wireless communication device will be established. When a cable is plugged into an existing printer, the printer operates as one with a connected camera. However, in a situation where the digital camera has not been properly connected logically, at an actual communication time, operation becomes unstable and normal operation cannot be guaranteed. If the printer is a wireless-capable printer, the operation of a direct communication protocol can be controlled in accordance to the wireless connection conditions. However, in the case of a wireless communication device attached to an existing printer that supports only wired connection, the device is physically separated. In addition, a printer that supports only wired connection has no wireless-related control means.

SUMMARY OF THE INVENTION

The object of the present invention is to control communication of data with a terminal device, which is connected to a wireless interface, within a power supply configuration.

According to the present invention, the foregoing object is attained by providing a communication apparatus having a wired interface for wired connection to a terminal device, and a wireless unit for connection to a terminal device wirelessly, comprising:

discriminating unit adapted to discriminate state of power supply; and communication control unit adapted to relay data communication between the terminal device and another terminal device, which is connected by the wireless unit, based upon result of discrimination by the discriminating unit.

Further, according to the present invention, the foregoing object is attained by providing a communication apparatus having first and second wired interfaces for wired connection to other devices, and a wireless unit for wireless connection, comprising:

discriminating unit adapted to discriminate state of power supply;

identifying unit adapted to identify whether a connection has been made to another device via the first wired interface or via the second wired interface; and execution unit adapted to execute processing for setting a connected device and the wireless unit, processing for querying the connected device concerning device type and processing for wireless connection by the wireless unit, in accordance with result of discrimination by the discriminating unit and result of identification by the identifying unit.

Further, according to the present invention, the foregoing object is attained by providing a method of controlling a communication apparatus having a wired interface for wired connection to a terminal device, and a wireless unit for connection to a terminal device wirelessly, comprising:

a discriminating step of discriminating state of power supply; and a communication control step of relaying data communication between the terminal device and another terminal device, which is connected by the wireless unit, based upon result of discrimination at the discriminating step.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail with reference to the drawings.

First Embodiment

Figure 2:
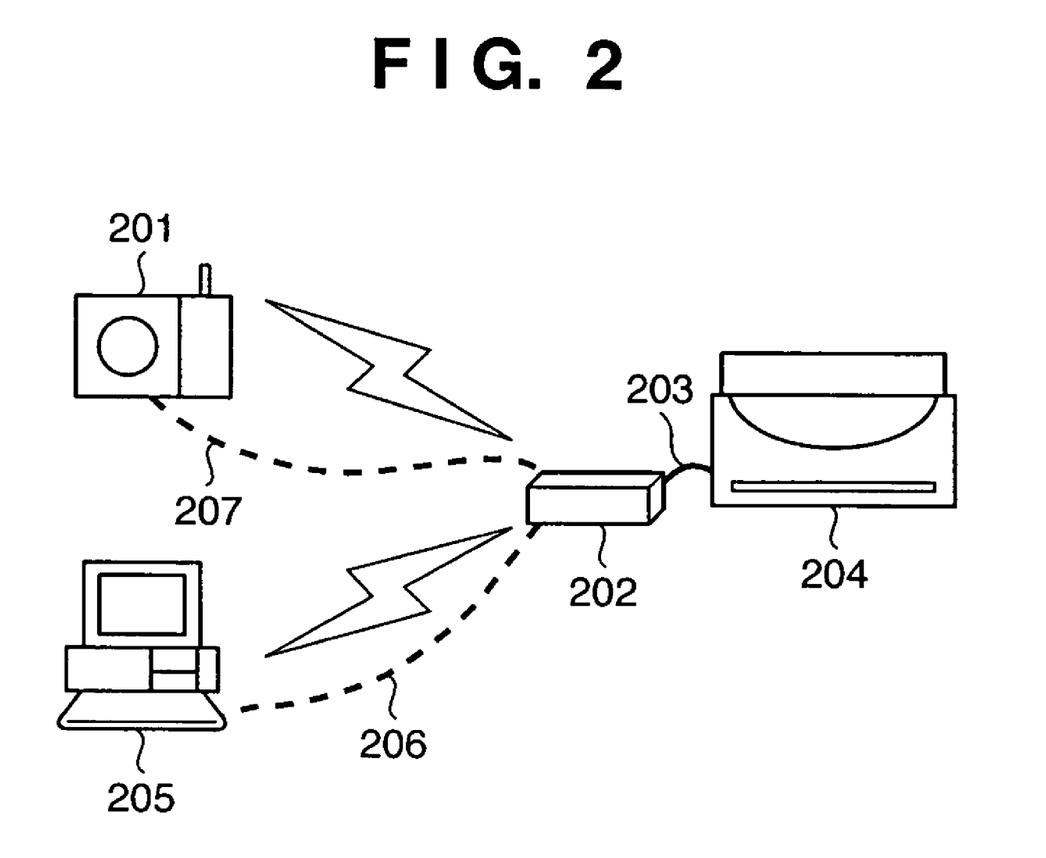
FIG. 2 is a diagram illustrating an example of the form of a connection between a digital camera and a printer in a first embodiment of the present invention.

FIG. 2 is a diagram illustrating an example of the form of a connection between a digital camera and a printer in a first embodiment of the present invention. A wireless-capable digital camera 201 in FIG. 2 has a wireless communication function such as a WLAN (Wireless Local Area Network) function or Bluetooth (registered trademark) function typified by IEEE 802.11b/11g/11a. A wireless communication device 202 has a plurality of communication interfaces such as a USB and a wireless LAN. The wireless communication device 202 is connected to a printer 204 by a USB cable 203 and communicates with the digital camera 201 by a wireless LAN. The wireless communication device 202 transmits image data, which has been sent from the digital camera 201, to the printer 204 via the USB cable 203.

When pairing of wireless information settings from a personal computer 205 to the wireless communication device 202 is performed, the personal computer is connected to the wireless communication device 202 by a USB cable 206. Further, the personal computer 205 has a short-distance wireless communication function of the kind mentioned above and is also capable of communicating with the wireless communication device 202 by the wireless LAN.

Further, if the wireless communication device 202 has been connected to the digital camera 201 by a USB cable 207, pairing of wireless information settings with the digital camera 201 is carried out.

The structure of the wireless communication device 202, which has the aforesaid plurality of operation modes and plurality of communication interfaces, will be described with reference to FIG. 3.

Figure 3:
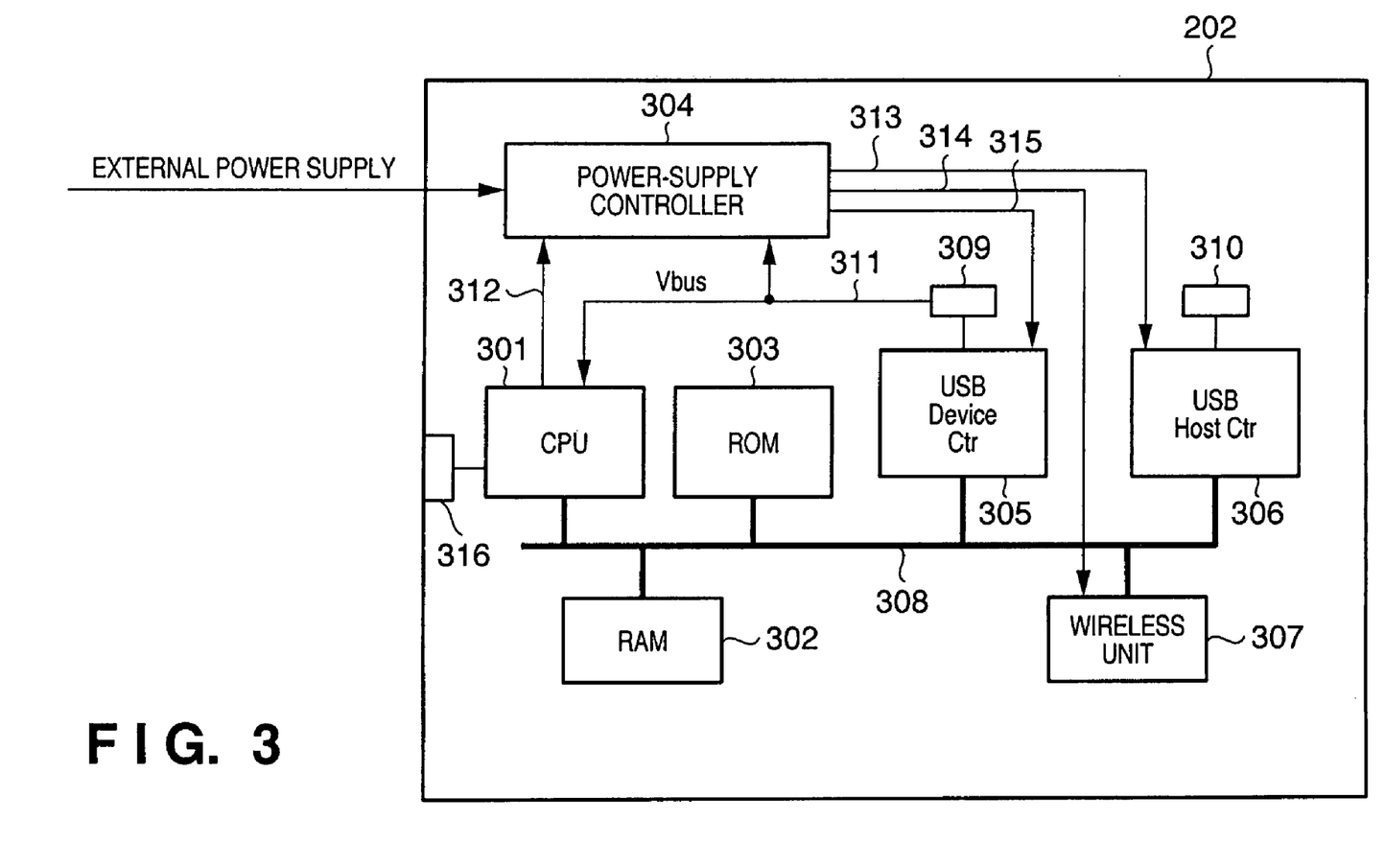
FIG. 3 is a block diagram illustrating an example of the structure of a wireless communication device according to the first embodiment.

FIG. 3 is a block diagram illustrating an example of the structure of the wireless communication device 202 according to the first embodiment. The wireless communication device 202 includes a CPU 301, a RAM 302, a ROM 303, a power-supply controller 304, a USB device controller (USB-Device-Ctr) 305, a USB controller (USB-Host-Ctr) 306, a wireless unit 307 and an internal bus 308.

The wireless communication device 202 further includes a USB device (USB-Device) connector 309 and a USB host (USB-Host) connector 310. A signal (Vbus) 311 detects whether or not a USB device has been connected. A control signal 312 is output by the CPU 401 to control the power-supply controller 304. A power supply 313 for the USB host controller 306, a power supply 314 for the wireless unit 307 and a power supply 315 for the USB device controller 305 are controlled by the power-supply controller 304.

A display device 316 comprises an LCD or LED for displaying the state of the connection of wireless communication device 202.

Figure 4:
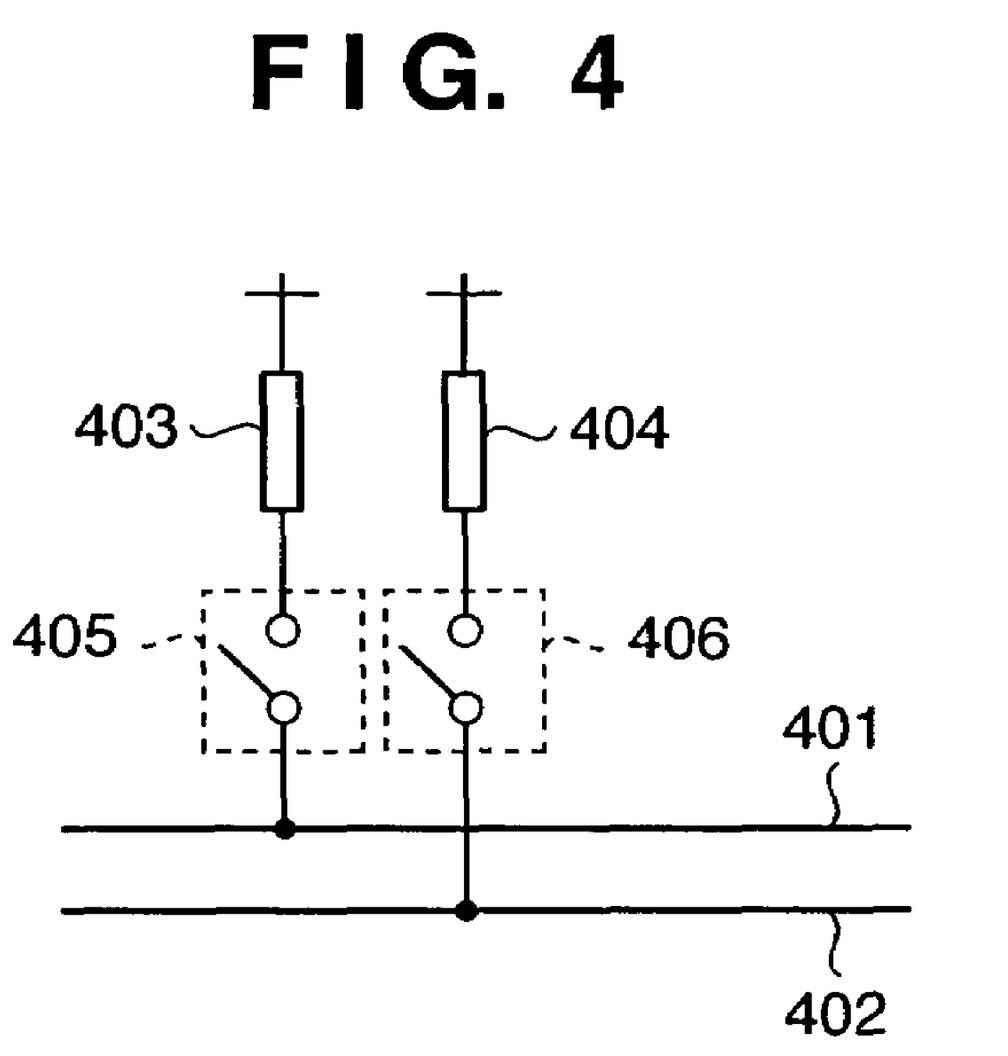
FIG. 4 is a diagram illustrating an example of the structure of a USB bus reset using a data signal line on the side of a USB device.

FIG. 4 is a diagram illustrating an example of the structure of a USB reset that uses data signal lines on the side of a USB device. Shown in FIG. 4 are USB data signal lines 401, 402, pull-up resistors 403, 404, and switches 405, 406 for controlling the connection between pull-up resistors and data signal lines.

Figure 5:
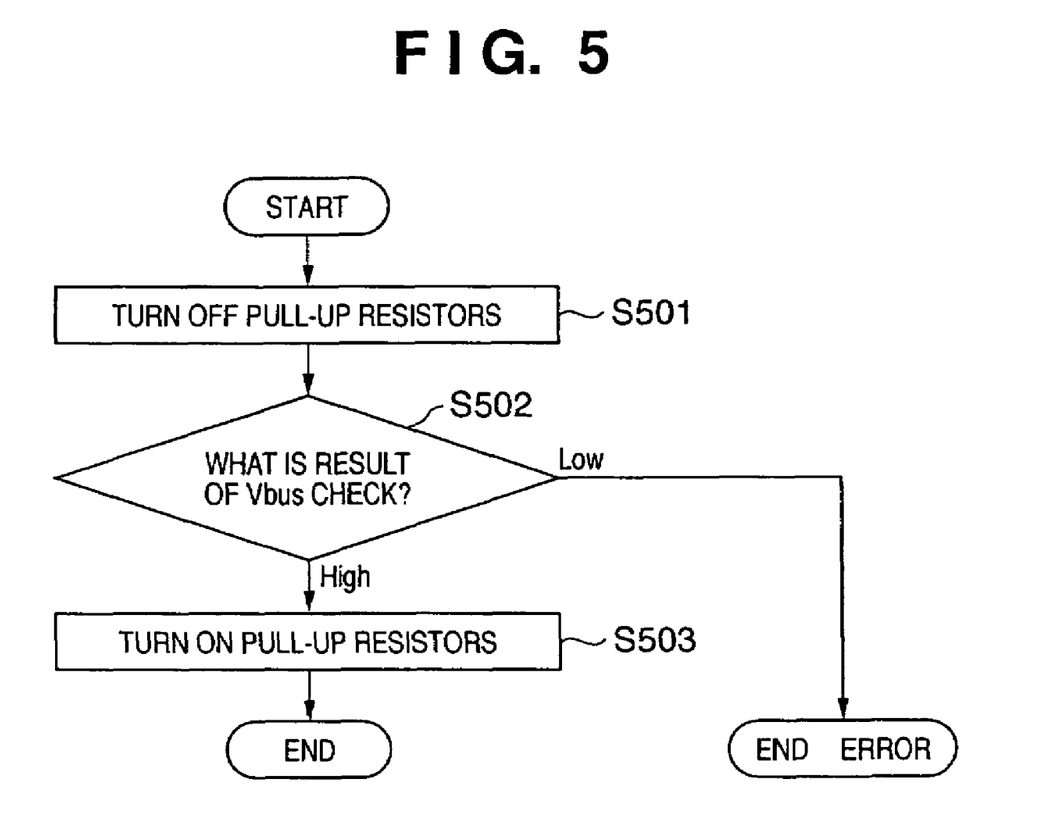
FIG. 5 is a flowchart illustrating processing for USB bus reset in the first embodiment.

Reference will be had to FIG. 5 to describe USB bus reset performed by the USB device controller 305. It should be noted that USB bus reset is processing whereby the CPU 301 monitors the signal (Vbus) 311, controls the USB device controller 305 and turns the pull-up resistors 403, 404 on or off.

FIG. 5 is a flowchart illustrating processing for USB bus reset according to the first embodiment. First, at step S501, the pull-up resistors 403, 404 attached to the data signal lines 401, 402, respectively, of the USB are disconnected by the switches 405, 406, respectively. Next, at step S502, the signal (Vbus) 311 is monitored. If the signal is at the low level, then a USB host device has not been connected to the USB device connector 309 and therefore an error indication is presented. Processing is then exited.

If the monitored signal 311 is at the high level, then a USB host device has been connected to the USB device connector 309 and therefore control proceeds to step S503. Here the pull-up resistors 403, 404 that were disconnected from the data signal lines 401, 402, respectively, are connected to the data signal lines 401, 402 by the switches 405, 406, respectively. At this time whether the two pull-up resistors 403, 404 are connected to the two data signal lines 401, 402 or whether just either one is connected depends upon the USB communication speed supported by the line itself.

Figure 6:
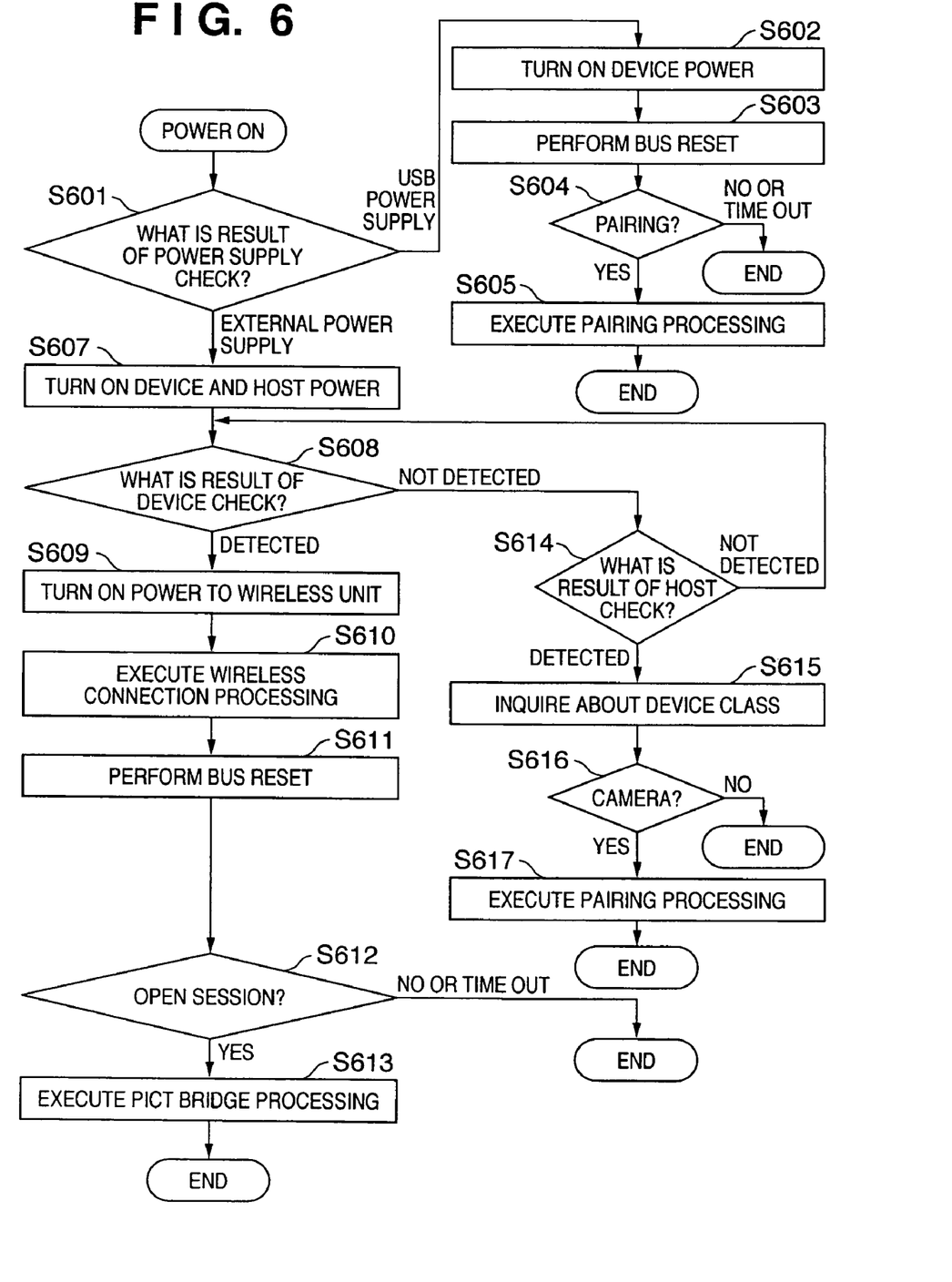
FIG. 6 is a flowchart illustrating connection control processing in the wireless communication device according to the first embodiment.

Next, reference will be had to FIG. 6 to describe connection control processing executed by the CPU 301 in a case where the personal computer 205, printer 204 or camera 201 has been connected by a USB cable to the USB host connector 310 as another device.

FIG. 6 is a flowchart illustrating connection control processing in the wireless communication device according to the first embodiment. When power is introduced to the wireless communication device 202, control proceeds to step S601, where the state of power supply is checked. If it is determined that power supply is by bus current of the USB, then it is judged that the connection is to the personal computer 205 and control proceeds to step S602. Here the power-supply controller 304 is controlled to feed current to the USB device controller 305. Then, at step S603, bus reset of the USB device is carried out. By performing bus reset, re-connection of the USB can be reported to the connected device artificially. After bus reset, control proceeds to step S604. Here if an inquiry regarding the type of USB device is received from the side of the personal computer 205, a response is made to the inquiry and then a command for shifting to a mode in which pairing information is exchanged is received, then control proceeds to step S605, where the wireless communication device 202 transitions to a pairing mode.

In the pairing mode, wireless communication setting information possessed by the wireless communication device 202 is delivered to the side of the personal computer 205 in advance or wireless communication setting information that has been set on the side of the personal computer 205 is accepted by the wireless communication device 202. The wireless communication setting information is information necessary for carrying out communication and includes a network identifier (SSID) for connecting to the wireless LAN, encrypted information and a device ID for direct print. When exchange of the pairing information ends, the user is notified of end of pairing by the display device 316 such as an LED, the user disconnects the USB cable 206 connecting the wireless communication device 202 and personal computer 205 and this processing is then exited.

Further, after the response is made to the inquiry concerning the type of device at step S604 mentioned above, if a pairing-mode start command is not sent within a fixed period of time or if information other than a pairing-mode start command is sent, then the user is notified of pairing failure using the display device 316 and this processing is then exited.

If the result of the check of power supply at step S601 is that supply of power is external, then control proceeds to step S607. Here the power-supply controller 304 is controlled to supply power to the USB device controller 305 and USB host controller 306. Then, at steps S608 and S614, the USB device controller 305 and USB host controller 306 are monitored alternately and whether or not there is a connected device is checked.

If a connected device is detected by the USB host controller 306 at step S614, control proceeds to step S615 and the connected device is queried with regard to device type. The device type is discriminated at step S616. If the device is not the digital camera 201, the fact that a device other than a digital camera has been connected is displayed on the display device 316 and this processing is then exited.

If it is found at step S616 that the device is the digital camera 201, then control proceeds to step and transition to the pairing mode is made. In the pairing mode, wireless communication setting information possessed by the wireless communication device 202 is delivered beforehand to the digital camera 201 or wireless communication setting information already possessed by the digital camera 201 is accepted by the wireless communication device 202. The wireless communication setting information is information necessary for carrying out communication and includes a network identifier (SSID) for connecting to the wireless LAN, encrypted information and a device ID for direct print. When exchange of the pairing information ends, the user is notified of end of pairing by the display device 316 such as an LED, the user disconnects the USB cable 207 connecting the wireless communication device 202 and digital camera 201 and this processing is then exited.

Figure 7:
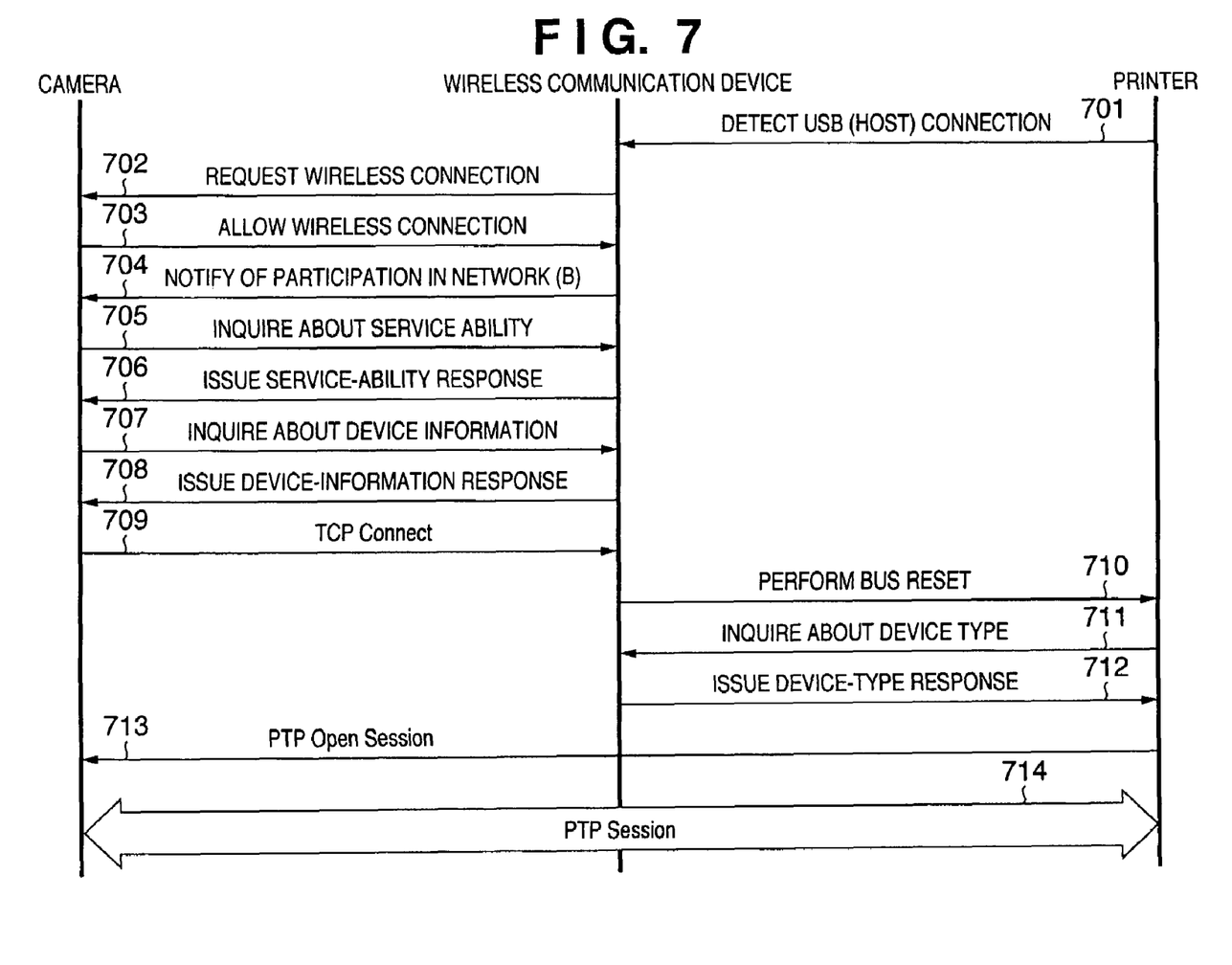
FIG. 7 is a diagram illustrating a sequence in a case where a digital camera and a printer perform printing wirelessly via a wireless communication device in the first embodiment.

Next, reference will be had to the sequence shown in FIG. 7 to describe processing executed by the wireless communication device 202 in a case where a connected device has been detected by the USB device controller 305 at step S608. Described as an example will be a case where the wireless-capable digital camera 201 transfers an image data file to the existing wire-capable printer 204 by wireless communication via the wireless communication device 202 to perform printing by the printer 204.

FIG. 7 is a diagram illustrating a sequence in a case where the digital camera 201 and printer 204 perform printing wirelessly via the wireless communication device 202 according to the first embodiment.

First, if a connected device is detected (701) by the USB device controller 305 at step S608 mentioned above, the device is regarded as the printer 204 and control proceeds to step S609. Here the power-supply controller 304 is controlled to introduce the power supply 314 to the wireless unit 307.

Next, at step S610, the wireless connection is established (702) based upon wireless communication setting information accepted at pairing or possessed by the wireless communication device 202 from the start. When the wireless connection is completed (703), the wireless communication device 202 sends the wireless network a signal, which notifies of participation in the network, as a broadcast signal (704). If the user selects print processing at the digital camera 201 connected to the wireless network, a service-ability inquiry signal is transmitted within the network by multicast (705).

The service requested by the digital camera 201 is print processing. In this example, since print processing is possible, the wireless communication device 202 notifies the digital camera 201, which is requesting print processing, of the fact that the service is available (706). Upon receiving this notification of service, the digital camera 201 transmits a device-information inquiry to the wireless communication device 202 (707).

As a result, the wireless communication device 202 gives notification of its own device information (708). This device information contains an IP and a device ID that is used in the host application. If the device ID of the wireless communication device 202 contained in the exchanged data at the time of pairing matches the device ID of the device of which notification in the network is being given, then the digital camera 201 executes a TCP connection to a prescribed port of the wireless communication device 202 (709).

Next, at step S611, the wireless communication device 202 that has received the TCP connection with respect to the prescribed port performs the above-mentioned USB bus reset by the USB device controller 305 (710) and causes the partner in the USB connection to recognize its own connection. Next, when the wireless communication device 202 responds (712) to a device-type inquiry (711) from the printer 204, the printer 204 construes that the digital camera 201 has been connected by wire and a sequence for wired direct printing is executed between the printer 204 and the digital camera 201 (713).

As a result, control proceeds from step S612 to step S613 and wireless direct printing becomes possible at the digital camera 201 (714). If, following response to the device class from the connected device after bus reset (710), PTP open session (713) is not executed by the connected device within a fixed period of time ("NO" or "TIME OUT" at step S612), then the fact that the connected device is other than a printer is displayed using the display device 316, wireless communication is aborted and processing is then exited.

It should be noted that even if the wirelessly communicating party is the personal computer 205 in a case where a connected device has been detected by the USB device controller 305, it is possible to perform wireless direct printing from the personal computer 205.

Further, operation is similar regardless of whether the form of the wireless connection is the infrastructure mode or adhoc mode stipulated by IEEE 802.11. For example, in the case of the adhoc mode, a wireless connection is established with the digital camera 201 or personal computer 205 that is the communicating party and a broadcast signal is transmitted only within the wireless adhoc network.

Figure 8:
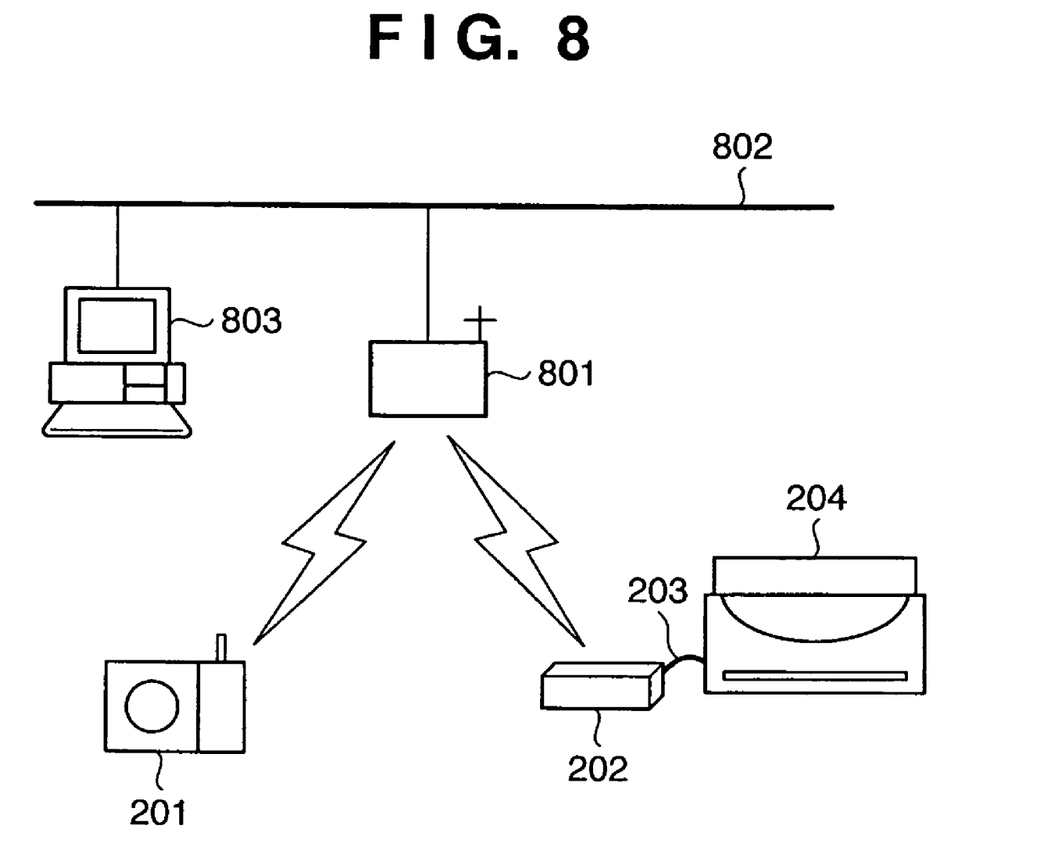
FIG. 8 is a diagram illustrating an example of the form of a connection in an infrastructure mode.

Further, in the case of the infrastructure mode shown in FIG. 8, the wireless communication device 202 establishes a wireless connection with an access point 801 and transmits a broadcast signal to the wireless network managed by the access point 801 and to a wired network 802 to which the access point 801 has been connected.

Accordingly, the difference between the infrastructure mode and the adhoc mode is merely that in the adhoc mode, the device of the communicating party also is required to be connected to the wireless network, whereas in the infrastructure mode, it does not matter whether the device of the communicating party is connected by wire or connected wirelessly as long as it is in a network reached by the broadcast signal.

Second Embodiment

A second embodiment according to the present invention will now be described in detail with reference to the drawings. Described as the second embodiment will be a case where the wireless communication device 202 operates as by being driven by an internal battery or the like and by USB-supplied power.

It should be noted that the structure of the wireless communication device according to the second embodiment is similar to that of the first embodiment shown in FIG. 3 and need not be described again.

The processing by the wireless communication device is similar to that of the flowchart of the first embodiment shown in FIG. 6 and will be described with reference to FIG. 6.

Following initialization, the CPU 301 checks the Vbus signal 311 of the USB device connector 309 at step S601. If the signal (Vbus) 311 is at the high level, this is regarded as indicating connection to the USB host device and processing for USB power supply of the first embodiment is executed (S602 to S605). If the signal 311 is at the low level, then this is regarded as indicating no connection to the USB host device and processing for external power supply of the first embodiment is executed (S607 to S617).

By thus checking the state of signal 311 after the introduction of power, processing can be executed in a manner similar to that of the first embodiment.

It should be noted that in the first and second embodiments, it is preferred that the display device 316 present an indication that the user may connect a desired printer to the USB device connector at the time of sequence execution.

In accordance with the first and second embodiments, as described above, a wireless communication device is connected to a printer which has a wired direct-print capability but which is not wireless-capable, thereby making it possible to communicate data wirelessly with a wireless-capable camera.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc.

Further, besides the case where the aforesaid functions according to the embodiments are implemented by executing the program codes read by a computer, it goes without saying that the present invention covers a case where an operating system or the like running on the computer performs a part of or the entire actual process in accordance with the designation of program codes and implements the functions according to the embodiments by such processing.

It goes without saying that the present invention further covers a case where, after the program codes read from the recording medium are written in a memory provided on a function expansion board inserted into the computer or provided in a function expansion unit connected to the computer, a CPU or the like contained in the function expansion board or function expansion unit performs a part of or the entire actual process in accordance with the designation of program codes and implements the functions of the above embodiments by such processing.

In accordance with the present invention, the user is provided with greater convenience by relaying data communication between a terminal device, which is connected to a wired interface, and another terminal device, which is connected by a wireless unit, in accordance with the state of power supply.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-073949 filed on Mar. 15, 2005, which is hereby incorporated by reference herein its entirety.

What is claimed is:

1. A communication apparatus having a Universal-Serial-Bus (USB) host interface and a USB device interface for wired connection to wired devices, and a wireless interface for a wireless connection to a wireless device, comprising:
a first discriminating unit adapted to discriminate whether a state of power supply is supplied by USB power supply via the USB device interface or is supplied by external power supply;
a second discriminating unit adapted to discriminate whether the wired device is connected to the communication apparatus via the USB host interface or via the USB device interface; and
an execution unit adapted to selectively execute either processing for sharing setting information for the wireless connection by the wireless interface with the wired device or processing for the wireless connection by the wireless interface, in accordance with discrimination by said first and second discriminating units, wherein the setting information is information for performing wireless communication between the communication apparatus and the wireless device.

2. The apparatus according to claim 1, further comprising a reset unit adapted to reset the USB device interface in response to a completion of the wireless connection by the wireless interface.

3. The apparatus according to claim 1, wherein in a case where the power supply state is a state in which a power is being supplied by the external power supply and the wired device is a printer, the execution unit executes the processing for the wireless connection by the wireless interface, and relay data communicates between the printer and a device connected by the wireless unit.

4. The apparatus according to claim 3, wherein in a case where an image capturing device has been connected by the wireless unit, the execution unit suppresses data communication with the printer until a wireless connection to the image capturing device is completed.

5. A method of controlling a communication apparatus having a Universal-Serial-Bus (USB) host interface and a USB device interface for a wired connection to wired devices, and a wireless interface for a wireless connection to a wireless device, comprising:

a first discriminating step of discriminating whether a state of power supply is supplied by USB power supply via the USB device interface or is supplied by external power supply;

a second discriminating step of discriminating whether the wired device is connected to the communication apparatus via the USB host interface or via the USB device interface; and an execution step of selectively executing either processing for sharing setting information for the wireless connection by the wireless interface with the wired device or processing for the wireless connection by the wireless interface, in accordance with discrimination in the first and second discriminating steps, wherein the setting information is information for performing wireless communication between the communication apparatus and the wireless device.

6. A computer-readable recording medium on which a program for causing a computer to execute the method of controlling a communication apparatus set forth in claim 5 has been recorded.

* * * * *